US009365687B2

(12) United States Patent
Gkinosatis

(10) Patent No.: US 9,365,687 B2
(45) Date of Patent: Jun. 14, 2016

(54) PVDC FORMULATION AND HEAT SHRINKABLE FILM

(75) Inventor: Dimitris Gkinosatis, Koropi Attica (GR)

(73) Assignee: FLEXOPACK S.A. PLASTICS INDUSTRY, Koropi (GR)

( * ) Notice: Subject to any disclaimer, the term of this patent is extended or adjusted under 35 U.S.C. 154(b) by 181 days.

(21) Appl. No.: 12/319,150

(22) Filed: Dec. 31, 2008

(65) Prior Publication Data

US 2009/0196962 A1 Aug. 6, 2009

(30) Foreign Application Priority Data

Jan. 2, 2008 (EP) .................... 08150005

(51) Int. Cl.
| | |
|---|---|
| *B32B 27/08* | (2006.01) |
| *B32B 27/16* | (2006.01) |
| *B32B 27/22* | (2006.01) |
| *B32B 27/30* | (2006.01) |
| *B65D 85/76* | (2006.01) |
| *C08J 5/18* | (2006.01) |
| *C08L 27/08* | (2006.01) |
| *C08L 9/06* | (2006.01) |
| *C08L 23/08* | (2006.01) |
| *C08L 25/06* | (2006.01) |
| *C08L 27/06* | (2006.01) |
| *C08L 91/00* | (2006.01) |

(52) U.S. Cl.
CPC . *C08J 5/18* (2013.01); *B32B 27/08* (2013.01); *C08L 27/08* (2013.01); *B32B 27/16* (2013.01); *B32B 27/22* (2013.01); *B32B 27/304* (2013.01); *B65D 85/76* (2013.01); *C08J 2327/08* (2013.01); *C08L 9/06* (2013.01); *C08L 23/0853* (2013.01); *C08L 25/06* (2013.01); *C08L 27/06* (2013.01); *C08L 91/00* (2013.01); *C08L 2205/02* (2013.01); *Y10T 428/1341* (2015.01); *Y10T 428/1383* (2015.01); *Y10T 428/31725* (2015.04); *Y10T 428/31931* (2015.04); *Y10T 428/31938* (2015.04)

(58) Field of Classification Search
USPC ......................... 524/502, 515, 519
See application file for complete search history.

(56) References Cited

U.S. PATENT DOCUMENTS

| | | |
|---|---|---|
| 2,380,054 A | 8/1943 | Lautmann |
| 2,376,185 A | 5/1945 | Randall |
| 3,299,194 A | 1/1967 | Golike |
| 3,356,192 A | 12/1967 | Cameron |
| 3,456,044 A | 7/1969 | Pahlke |
| 3,536,192 A | 10/1970 | Couper |
| 3,846,569 A | 11/1974 | Kaplan |
| 3,908,336 A | 9/1975 | Forslund |
| 3,956,229 A | 5/1976 | Bollen et al. |
| 4,064,296 A | 12/1977 | Bornstein et al. |
| 4,207,364 A | 6/1980 | Nyberg |
| 4,254,869 A | 3/1981 | Heier |
| 4,362,834 A * | 12/1982 | Lefevre et al. ................ 524/297 |
| 4,399,181 A | 8/1983 | Yoshimura et al. |
| 4,595,433 A | 6/1986 | Ford et al. |
| 4,612,221 A | 9/1986 | Biel et al. |
| 4,650,721 A | 3/1987 | Ashcraft et al. |
| 4,705,707 A | 11/1987 | Winter |
| 4,716,061 A | 12/1987 | Winter |
| 4,786,561 A | 11/1988 | Fong |
| 4,801,486 A | 1/1989 | Quacquarella et al. |
| 4,863,769 A | 9/1989 | Lustig et al. |
| 4,869,049 A | 9/1989 | Richards et al. |
| 4,911,979 A | 3/1990 | Nishimoto et al. |
| 4,912,149 A * | 3/1990 | Robeson et al. .............. 524/501 |
| 4,934,529 A | 6/1990 | Richards et al. |
| 4,941,310 A | 7/1990 | Kristen |
| 4,976,898 A | 12/1990 | Lustig et al. |
| 4,977,022 A | 12/1990 | Mueller |
| 4,990,562 A | 2/1991 | Chou et al. |
| 5,001,192 A * | 3/1991 | Sun .................................. 525/76 |
| 5,034,281 A | 7/1991 | Kawasaki et al. |
| 5,079,051 A | 1/1992 | Garland et al. |
| 5,169,708 A | 12/1992 | Amaral et al. |
| 5,179,168 A | 1/1993 | Hirasawa |
| 5,256,351 A | 10/1993 | Lustig et al. |
| 5,256,428 A | 10/1993 | Lustig et al. |
| 5,296,580 A | 3/1994 | Matsunaga et al. |
| 5,298,202 A | 3/1994 | Schirmer |
| 5,302,402 A | 4/1994 | Dudenhoeffer et al. |
| 5,397,613 A | 3/1995 | Georgelos |
| 5,562,958 A | 10/1996 | Walton et al. |

(Continued)

FOREIGN PATENT DOCUMENTS

| | | |
|---|---|---|
| AU | 511 195 B2 | 7/1980 |
| EP | 0 005 660 | 11/1979 |

(Continued)

OTHER PUBLICATIONS

European Search Report corresponding to European Patent Application No. 08173056.6-2109 dated Mar. 16, 2009.
ASTM BS2782.
ASTM D1003.
ASTM D1525.
ASTM D2732.
Annonymous, "Advantages of metallocene ethylene olymer resins in multilayer stretch films," Research Disclosure, Mason Publications, Hampshire, GB. vol. 419, No. 26 (1999).
Annonymous, "Some benefits from the use of metallocene ethylene polymers in blown and cast films," Research Disclosure, Mason Publications, Hampshire, GB. vol. 392, No. 54 (1996).

(Continued)

*Primary Examiner* — Ramsey Zacharia
(74) *Attorney, Agent, or Firm* — Jenkins, Wilson, Taylor & Hunt, P.A.

(57) ABSTRACT

The present invention is directed to a polymer blend formulation and to heat shrinkable film, bags, pouches and the like made therefrom. The invention is further directed to a method of producing a heat shrinkable film with the proper gas permeability properties so that it is ideal for packaging and preservation of gassing cheese.

20 Claims, No Drawings

(56) References Cited

U.S. PATENT DOCUMENTS

| | | | |
|---|---|---|---|
| 5,593,747 A | 1/1997 | Georgelos | |
| 5,645,788 A | 7/1997 | Bekele | |
| 5,698,279 A | 12/1997 | Vicik | |
| 5,834,077 A | 11/1998 | Babrowicz | |
| 5,837,335 A | 11/1998 | Babrowicz | |
| 5,851,610 A | 12/1998 | Ristey et al. | |
| 5,888,615 A * | 3/1999 | Mascarenhas et al. | 428/141 |
| 5,983,607 A | 11/1999 | Mihalov et al. | |
| 6,013,378 A | 1/2000 | White et al. | |
| 6,058,998 A | 5/2000 | Kristen | |
| 6,065,272 A | 5/2000 | Lecomte | |
| 6,074,715 A | 6/2000 | Lind et al. | |
| 6,088,996 A | 7/2000 | Maruyama | |
| 6,146,726 A | 11/2000 | Yoshii et al. | |
| 6,221,410 B1 | 4/2001 | Ramesh et al. | |
| 6,258,423 B1 | 7/2001 | Giori | |
| 6,274,246 B1 | 8/2001 | Eggers et al. | |
| 6,299,984 B1 | 10/2001 | Forloni | |
| 6,346,285 B1 | 2/2002 | Ramesh | |
| 6,406,763 B1 | 6/2002 | Wolf et al. | |
| 6,458,437 B1 | 10/2002 | Ito et al. | |
| 6,506,463 B1 | 1/2003 | Cahill et al. | |
| 6,514,583 B1 | 2/2003 | Ahlgren et al. | |
| 6,516,588 B2 | 2/2003 | Jensen et al. | |
| 6,531,198 B2 | 3/2003 | Lind et al. | |
| 6,534,137 B1 | 3/2003 | Vadhar | |
| 6,558,760 B1 | 5/2003 | Paleari et al. | |
| 6,572,959 B1 | 6/2003 | Buongiorno et al. | |
| 6,592,975 B1 | 7/2003 | Ueyama et al. | |
| 6,663,905 B1 | 12/2003 | Ennis et al. | |
| 6,682,792 B2 | 1/2004 | Schmal et al. | |
| 6,777,046 B1 | 8/2004 | Tatarka et al. | |
| 6,960,635 B2 | 11/2005 | Stevens et al. | |
| 6,984,695 B2 | 1/2006 | Brown et al. | |
| 7,473,473 B2 | 1/2009 | Verrocchi | |
| 7,611,770 B2 | 11/2009 | Kennedy et al. | |
| 7,736,726 B2 | 6/2010 | McAllister et al. | |
| 8,129,006 B2 | 3/2012 | Ginossatis | |
| 8,697,211 B2 | 4/2014 | Gkinosatis | |
| 2002/0038535 A1 | 4/2002 | Jensen et al. | |
| 2002/0119334 A1 | 8/2002 | Shepard et al. | |
| 2002/0172834 A1 | 11/2002 | Rivett et al. | |
| 2003/0008084 A1 | 1/2003 | Vicik et al. | |
| 2003/0012900 A1 | 1/2003 | Wolf et al. | |
| 2003/0073785 A1 | 4/2003 | Okada et al. | |
| 2003/0124452 A1 | 7/2003 | Nair et al. | |
| 2003/0213804 A1 | 11/2003 | Chomik et al. | |
| 2003/0218022 A1 | 11/2003 | Chomik et al. | |
| 2003/0220453 A1 | 11/2003 | Ebara et al. | |
| 2004/0020175 A1 | 2/2004 | Stravitz | |
| 2004/0043238 A1 | 3/2004 | Wuest et al. | |
| 2004/0048086 A1 | 3/2004 | Kennedy et al. | |
| 2004/0065052 A1 | 4/2004 | Ramesh et al. | |
| 2004/0074904 A1 | 4/2004 | Share et al. | |
| 2004/0157077 A1 | 8/2004 | Roussos | |
| 2004/0194433 A1 | 10/2004 | Chomik et al. | |
| 2005/0044819 A1 | 3/2005 | Chomik et al. | |
| 2005/0064123 A1 | 3/2005 | Chomik et al. | |
| 2005/0129811 A1 | 6/2005 | Kraimer et al. | |
| 2005/0147778 A1 | 7/2005 | Tai et al. | |
| 2005/0191439 A1 | 9/2005 | Hirose et al. | |
| 2005/0235611 A1 | 10/2005 | Roussos | |
| 2005/0239961 A1 | 10/2005 | Saraf et al. | |
| 2005/0271877 A1 | 12/2005 | Ginossatis | |
| 2006/0010837 A1 | 1/2006 | Jurus | |
| 2006/0172143 A1 | 8/2006 | Breese et al. | |
| 2006/0177616 A1 | 8/2006 | Barber et al. | |
| 2006/0177641 A1 | 8/2006 | Breese et al. | |
| 2006/0199030 A1 | 9/2006 | Liang et al. | |
| 2006/0199912 A1 | 9/2006 | Fuchs et al. | |
| 2006/0254219 A1 | 11/2006 | Alipour et al. | |
| 2006/0272767 A1 | 12/2006 | Kreitman et al. | |
| 2006/0283153 A1 | 12/2006 | Nakano | |
| 2006/0286323 A1 | 12/2006 | Siegel et al. | |
| 2007/0042089 A1 | 2/2007 | Grah | |
| 2007/0082150 A1 | 4/2007 | Ginossatis | |
| 2007/0089688 A1 | 4/2007 | Nitzsche et al. | |
| 2007/0178285 A1 | 8/2007 | Rasanen et al. | |
| 2008/0003332 A1 | 1/2008 | Ginossatis | |
| 2008/0070047 A1 | 3/2008 | Rehkugler et al. | |
| 2008/0095960 A1 | 4/2008 | Schell et al. | |
| 2008/0115463 A1 | 5/2008 | Wilson | |
| 2008/0255311 A1 | 10/2008 | Chang et al. | |
| 2008/0274314 A1 | 11/2008 | Gkinosatis | |
| 2008/0274328 A1 | 11/2008 | Gkinosatis | |
| 2008/0305220 A1 | 12/2008 | Gkinosatis | |
| 2009/0013656 A1 | 1/2009 | Nasiatka et al. | |
| 2009/0176117 A1 | 7/2009 | Gkinosatis | |
| 2009/0191392 A1 | 7/2009 | Gkinosatis | |
| 2009/0240227 A1 | 9/2009 | Toro et al. | |
| 2009/0263599 A1 | 10/2009 | Gkinosatis | |
| 2010/0028574 A1 | 2/2010 | Gkinosatis | |
| 2010/0032098 A1 | 2/2010 | Lalli et al. | |
| 2010/0034939 A1 | 2/2010 | Gkinosatis | |
| 2011/0159263 A1 | 6/2011 | Gkinosatis | |
| 2012/0279181 A1 | 11/2012 | Gkinosatis | |
| 2012/0289645 A1 | 11/2012 | Tice et al. | |
| 2013/0019568 A1 | 1/2013 | Gkinosatis | |
| 2013/0209797 A1 | 8/2013 | Gkinosatis | |
| 2013/0227916 A1 | 9/2013 | Gkinosatis | |
| 2015/0010764 A1 | 1/2015 | Gkinosatis | |
| 2015/0210454 A1 | 7/2015 | Gkinosatis | |

FOREIGN PATENT DOCUMENTS

| | | |
|---|---|---|
| EP | 0 286 407 | 10/1988 |
| EP | 0 402 043 | 12/1990 |
| EP | 0 472 418 | 2/1992 |
| EP | 0 627 466 | 12/1994 |
| EP | 627465 A1 * | 12/1994 |
| EP | 0 810 087 | 12/1997 |
| EP | 1 072 632 A2 | 1/2001 |
| EP | 0 930 349 B1 | 6/2003 |
| EP | 1 060 077 | 6/2003 |
| EP | 1 131 205 | 12/2004 |
| EP | 1 514 680 A1 | 3/2005 |
| EP | 1 415 930 | 4/2006 |
| EP | 1 770 116 A1 | 4/2007 |
| EP | 1 854 625 A1 | 11/2007 |
| EP | 08162162.5 | 8/2008 |
| EP | 1 985 440 A2 | 10/2008 |
| EP | 1 985 443 A2 | 10/2008 |
| EP | 1 995 058 A1 | 11/2008 |
| EP | 2 077 239 A2 | 7/2009 |
| EP | 2 077 297 A1 | 7/2009 |
| EP | 2 085 216 A1 | 8/2009 |
| EP | 2 111 979 A2 | 10/2009 |
| EP | 2 147 783 A1 | 1/2010 |
| GB | 792290 | 3/1958 |
| GB | 1 140 765 | 1/1969 |
| GB | 2 236 531 | 4/1991 |
| GB | 2236531 A * | 4/1991 |
| JP | 62107810 A | 5/1987 |
| JP | 03 200534 | 9/1991 |
| JP | 07196818 | 8/1995 |
| JP | 07206004 | 8/1995 |
| JP | 07206005 | 8/1995 |
| JP | 07206006 | 8/1995 |
| JP | 2002-234975 | 8/2002 |
| JP | 2003-159761 | 6/2003 |
| JP | 2005-047959 | 2/2005 |
| JP | 2005-335111 | 12/2005 |
| JP | 2006-247870 | 9/2006 |
| NZ | 567768 | 11/2009 |
| NZ | 567767 | 5/2010 |
| WO | WO96/01736 | 1/1996 |
| WO | WO97/46384 | 12/1997 |
| WO | WO98/21274 | 5/1998 |
| WO | WO98/21276 | 5/1998 |
| WO | WO99/44824 | 9/1999 |
| WO | WO99/57612 | 11/1999 |
| WO | WO00/61439 | 10/2000 |
| WO | WO01/23268 | 4/2001 |
| WO | WO02/26493 | 4/2002 |

(56) References Cited

FOREIGN PATENT DOCUMENTS

| WO | WO03/020515 | 3/2003 |
|---|---|---|
| WO | WO 2006/053885 | 5/2006 |
| WO | WO2006/075141 | 7/2006 |
| WO | WO2006/102152 | 9/2006 |
| WO | WO2007/053603 | 5/2007 |
| WO | WO2008/091321 | 7/2008 |
| WO | WO2008/118554 | 10/2008 |
| WO | WO 2011/029597 | 3/2011 |

OTHER PUBLICATIONS

ASTM D3418-08. Standard Test Method for Transition Temperatures and Enthalpies of Fusion and Crystallization of Polymers by Differential Scanning Calorimetry. American National Standards Institute. Dec. 2008. www.astm.org.
ASTM D882-09. Standard Test Method for Tensile Properties of Thin Plastic Sheeting. American National Standards Institute. Jan. 2009. www.astm.org.
ASTM F1927-07. Standard Test Method for Determination of Oxygen Gas Transmission Rate, Permeability and Permeance at Controlled Relative Humidity Through Barrier Materials Using a Coulometric Detector. American National Standards Institute. Aug. 2007. www.astm.org.
English abstract of JP 2005-103902, USUI, Apr. 2005.
European Search Report corresponding to European Patent Application No. 08173057.4-2307 dated Sep. 22, 2009.
Extended European Search Report corresponding to European Patent Application No. 05021541.7-2115 dated Dec. 2, 2005.
Extended European Search Report corresponding to European Patent Application No. 08156814 dated Oct. 9, 2008.
Extended European Search report corresponding to European Patent Application No. 09151289.7-2124 dated Jun. 8, 2009.
Interview Summary corresponding to U.S. Appl. No. 12/150,261 dated Dec. 28, 2010.
Machine Translation of JP 2005-103902, USUI, Apr. 2005.
Official Action corresponding to U.S. Appl. No. 11/528,741 dated Mar. 30, 2010.
Official Action corresponding to U.S. Appl. No. 11/528,741 dated Jan. 4, 2011.
Official Action corresponding to U.S. Appl. No. 11/801,609 dated Sep. 15, 2009.
Official Action corresponding to U.S. Appl. No. 11/801,609 dated Feb. 5, 2010.
Official Action corresponding to U.S. Appl. No. 11/801,609 dated Jul. 15, 2010.
Official Action corresponding to U.S. Appl. No. 12/150,168 dated Feb. 16, 2011.
Official Action corresponding to U.S. Appl. No. 12/150,261 dated Oct. 27, 2009.
Official Action corresponding to U.S. Appl. No. 12/150,261 dated Jul. 7, 2010.
Official Action corresponding to U.S. Appl. No. 12/319,149 dated Oct. 15, 2009.
Official Action corresponding to U.S. Appl. No. 12/319,149 dated Jul. 7, 2010.
Official Action corresponding to U.S. Appl. No. 12/322,347 dated Sep. 14, 2010.
Official Action corresponding to U.S. Appl. No. 12/508,233 dated Mar. 9, 2011.
ASTM D3985. Standard Test Method for Oxygen Gas Transmission Rate Through Plastic Film and Sheeting Using a Coulometric Sensor. American National Standards Institute. pp. 1-7. www.astm.org.
Official Action corresponding to U.S. Appl. No. 12/150,261 dated Mar. 22, 2011.
Official Action corresponding to U.S. Appl. No. 12/154,662 dated Mar. 29, 2011.
Official Action corresponding to U.S. Appl. No. 12/319,149 dated Mar. 22, 2011.
Official Action corresponding to U.S. Appl. No. 12/322,347 dated Mar. 16, 2011.
"15.13×EA—Ethylene Vinyl Acetate (EVA) Copolymers (>50% Ethylene)—European Adhesives," The ChemQuest Group, Inc. http://web.archive.org/web/20080219220919/http://www.chemquest.com/store/ethylene-vinyl-acetate-copolymers-european-adhesives.html (Aug. 26, 2011) (2 pages).
"DuPont™ Elvax® 3170," DuPont Packaging & Industrial Polymers. 3 pages (2004) http://web.archive.org/web/20060516114601/http://www2.dupont.com/Elvax/en_US/assets/downloads/vax3170.pdf.
Extended European Search Report corresponding to European Patent Application No. 08154742.4-2124 dated Jul. 2, 2009.
Harper, "Modern Plastics Handbook," McGraw-Hill: New York, New York. pp. 3.17-3.22 (2000).
Hough, M., and Dolbey, R., "Modern Plastics Compendium, vol. 1—Key Properties and Sources," Smithers Rapra Technology. pp. 87-124 (1995).
Huskić, M., and Šebenik, A., "Characterization of Crosslinked Ethylene-Vinylacetate Copolymers," Polymer International. vol. 31, No. 1 pp. 41-44 (1993).
Interview Summary corresponding to U.S. Appl. No. 12/150,261 dated Sep. 21, 2011.
Interview Summary corresponding to U.S. Appl. No. 12/322,347 dated Sep. 21, 2011.
Kipp, "Plastic Material Data Sheets," MatWeb (2004) (5 pages).
Official Action corresponding to U.S. Appl. No. 11/528,741 dated May 18, 2011.
Official Action corresponding to U.S. Appl. No. 11/801,609 dated Jun. 20, 2011.
Official Action corresponding to U.S. Appl. No. 12/154,662 dated Aug. 18, 2011.
Official Action corresponding to U.S. Appl. No. 12/512,361 dated Aug. 31, 2011.
Petrie, "Handbook of Adhesives and Sealants," 2nd Edition. McGraw-Hill: New York, New York. pp. 465-466 (2007).
"Polymer Blend," IUPAC Compendium of Chemical Terminology. 2nd Edition (1997).
Interview Summary corresponding to U.S. Appl. No. 12/319,149 dated Oct. 17, 2011.
Notice of Allowance corresponding to U.S. Appl. No. 11/528,741 dated Oct. 28, 2011.
Official Action corresponding to U.S. Appl. No. 11/801,609 dated Jan. 30, 2012.
Official Action corresponding to U.S. Appl. No. 12/150,168 dated Sep. 23, 2011.
Official Action corresponding to U.S. Appl. No. 12/154,662 dated Jan. 18, 2012.
Official Action corresponding to U.S. Appl. No. 12/319,149 dated Dec. 2, 2011.
Official Action corresponding to U.S. Appl. No. 12/322,347 dated Oct. 26, 2011.
Official Action corresponding to U.S. Appl. No. 12/508,233 dated Nov. 23, 2011.
Official Action corresponding to U.S. Appl. No. 12/957,947 dated Jan. 17, 2012.
Unisource—Moisture Barrier & Oxygen Barrier Transmission Rates; <http://www.unisourcelink.com/packaging/pdf/MoistureBarrier.pdf> (Retrieved on Jan. 10, 2012).
"Filling and sealing of containers" in Fellows, P.J. (2000). Food Processing Technology—Principles and Practice (2nd Edition). Woodhead Publishing.
Extended European Search Report corresponding to European Patent Application No. 10193414.9—1217 dated May 9, 2011.
Interview Summary corresponding to U.S. Appl. No. 11/801,609 dated Jul. 31, 2012.
Interview Summary corresponding to U.S. Appl. No. 12/150,261 dated Jun. 12, 2012.
Interview Summary corresponding to U.S. Appl. No. 12/319,149 dated Jun. 15, 2012.
Interview Summary corresponding to U.S. Appl. No. 12/508,233 dated Apr. 26, 2012.
Interview Summary corresponding to U.S. Appl. No. 13/722,323 dated Jan. 22, 2016.

(56) References Cited

OTHER PUBLICATIONS

Notice of Allowance corresponding to U.S. Appl. No. 12/150,168 dated Nov. 25, 2013.
Notice of Allowance corresponding to U.S. Appl. No. 13/157,876 dated Nov. 12, 2015.
Official action corresponding to European Patent Application No. 10 193 414.9—1303 dated Oct. 29, 2014.
Official Action corresponding to New Zealand Patent Application No. 626181 dated Jun. 18, 2014.
Official Action corresponding to U.S. Appl. No. 11/801,609 dated Feb. 2, 2016.
Official Action corresponding to U.S. Appl. No. 11/801,609 dated Jun. 12, 2015.
Official Action corresponding to U.S. Appl. No. 11/801,609 dated Nov. 29, 2013.
Official Action corresponding to U.S. Appl. No. 11/801,609 dated Sep. 24, 2014.
Official Action corresponding to U.S. Appl. No. 12/150,168 dated Apr. 26, 2013.
Official Action corresponding to U.S. Appl. No. 12/150,168 dated Aug. 14, 2012.
Official Action corresponding to U.S. Appl. No. 12/150,261 dated Jan. 31, 2012.
Official Action corresponding to U.S. Appl. No. 12/319,149 dated Aug. 27, 2012.
Official Action corresponding to U.S. Appl. No. 12/322,347 dated Aug. 1, 2014.
Official Action corresponding to U.S. Appl. No. 12/322,347 dated May 15, 2012.
Official Action corresponding to U.S. Appl. No. 12/322,347 dated May 20, 2015.
Official Action corresponding to U.S. Appl. No. 12/426,496 dated Feb. 7, 2012.
Official Action corresponding to U.S. Appl. No. 12/508,233 dated Jun. 6, 2012.
Official Action corresponding to U.S. Appl. No. 12/512,361 dated May 2, 2012.
Official Action corresponding to U.S. Appl. No. 12/957,947 dated Apr. 24, 2014.
Official Action corresponding to U.S. Appl. No. 12/957,947 dated Jan. 7, 2015.
Official Action corresponding to U.S. Appl. No. 12/957,947 dated Jul. 24, 2013.
Official Action corresponding to U.S. Appl. No. 12/957,947 dated Sep. 16, 2015.
Official Action corresponding to U.S. Appl. No. 12/957,947 dated Sep. 25, 2012.
Official Action corresponding to U.S. Appl. No. 13/157,876 dated Jun. 2, 2014.
Official Action corresponding to U.S. Appl. No. 13/157,876 dated Mar. 3, 2015.
Official Action corresponding to U.S. Appl. No. 13/157,876 dated Nov. 19, 2013.
Official Action corresponding to U.S. Appl. No. 13/523,462 dated Jan. 30, 2015.
Official Action corresponding to U.S. Appl. No. 13/523,462 dated Sep. 21, 2015.
Official Action corresponding to U.S. Appl. No. 13/682,160 dated Jan. 29, 2016.
Official Action corresponding to U.S. Appl. No. 13/682,160 dated Jun. 15, 2015.
Official Action corresponding to U.S. Appl. No. 13/722,323 dated Jan. 7, 2015.
Official Action corresponding to U.S. Appl. No. 13/722,323 dated Jul. 17, 2015.
Official Action corresponding to U.S. Appl. No. 13/722,323 dated Mar. 27, 2014.
Official Action corresponding to U.S. Appl. No. 14/612,175 dated Dec. 9, 2015.
Official Action corresponding to United Kingdom Patent Application No. GB1020302.4 dated Dec. 11, 2014.
Official Action corresponding to United Kingdom Patent Application No. GB1020302.4 dated Jul. 2, 2014.
"Baymod L 2450," Product Data Sheet, LANXESS. (2 pages) (2007).
"Elvaloy resins," Product Data Sheet, DuPont Packaging & Industrial Polymers. (2 pages) (2010).
"Polybutylene terephthalate (PBT)," 1 page <http://www.britannica.com/EBchecked/topic/468341/polybutylene-terephthalate-PBT> (Accessed on Jun. 13, 2012).
"Polybutylene terephthalate," Britannica Online Encyclopedia. pp. 1-3 (Accessed on Sep. 7, 2011) <http://www.britannica.com/EBchecked/topic/468341/polybutylene-terephthalate-PBT>.

* cited by examiner

PVDC FORMULATION AND HEAT SHRINKABLE FILM

RELATED APPLICATIONS

This application claims the benefit of European Application No. 08150005.0, filed Jan. 2, 2008, the entire disclosure of which is herein incorporated by reference.

TECHNICAL FIELD

The present invention is directed to a polymer blend formulation and to heat shrinkable film, bags, pouches and the like made therefrom. The invention is further directed to a method of producing a heat shrinkable film with the proper gas permeability properties so that it is ideal for packaging and preservation of gassing cheese.

BACKGROUND

Gassing cheese products are generally characterized by the emission of carbon dioxide during their curing process. Packaging films used for packaging of such cheese must be able to allow carbon dioxide escape, so that a possible "ballooning" effect is avoided. At the same time, oxygen permeability should be as low as possible, so that the oxidation-deterioration of the cheese is minimized.

Heat shrinkable films are often used for gassing cheese packaging due to the good aesthetic appearance that heat shrinkability induces. High transparency of the pack is also important, so that possible consumers are attracted by the pack.

The majority of heat shrinkable films used in this area comprise PVDC as barrier layer. PVDC is difficult to extrude and quite easy to burn and deteriorate during the extrusion process.

PVDC formulations like for example described in prior art patents are commonly used.

Generally these PVDC formulations incorporate high percentage of plasticizers or stabilizers in order to increase the permeability to CO2. Common plasticizers/stabilizers are epoxidized compounds like epoxidized soybean oil, epoxidized linseed oil, etc. One negative effect is that these compounds tend to migrate from the PVDC layer to other layers, thus creating delaminations and, most dangerously, change of barrier properties as time passes. This is an undesirable phenomenon.

So, several features that should characterize a heat shrinkable film intended for use in packaging of gassing cheese are
1. High shrinkage
2. Excellent optics
3. Efficient heat sealability so that bags can be made
4. Avoidance of plasticizer use
5. Good processability of PVDC, no oxidation during extrusion
6. High CO2 permeability, not changing over time
7. High O2 barrier, not changing over time.

These features are matched with the PVDC combination of the present invention and with the heat shrinkable films we further advice.

SUMMARY OF THE INVENTION

It is therefore the object of this invention to make a polymer blend providing the above characteristics.

This is solved by a polymer blend comprising
A. PVDC polymer
B. Ethylene vinyl acetate with more than 40% vinyl acetate (per weight)
C. PVC
D. Epoxidized oil compound and optionally other additives.

For example, the invention comprises a PVDC combination with the following recipe:
Blend of
a copolymer PVDC as base resin
epoxidized materials less than 2% per weight
ethylene vinyl acetate copolymer with percentage of 40 to 50% vinyl acetate per weight
PVC content more than 0% and less than 2%
silica and talc
possibly other materials like silicon polymers, high density polyethylene, tetrasodium pyrophospthate It is further the object of this invention to extrude the above described PVDC formulation without deterioration even in high shear rates.

It is further the object of this invention to produce a multilayer film incorporating a PVDC layer comprising the above described recipe. The other layers may preferably comprise ethylene alpha olefin copolymers, propylene alpha olefin copolymers, propylene ethylene copolymers, styrene polymers or ionomers.

THE DEFINITIONS USED IN THE FOLLOWING ARE AS FOLLOWS

The term "film" refers to a flat or tubular flexible structure of thermoplastic material.

The term "heat shrinkable" refers to a film that shrinks at least 10% in at least one of the longitudinal and transverse directions when heated at 90° C. for 4 seconds. The shrinkability is measured according to ASTM 2732 with water as a heating medium. This test method covers the determination of the degree of unrestrained linear thermal shrinkage at given specimen temperatures of a plastic film and sheeting of 0.76 mm thickness or less.

All measurement methods mentioned herein are readily available for the skilled person. For example, they can be obtained from the American National Standards Institute at: www.webstore.ansi.org The phrase "longitudinal direction" or "machine direction" herein abbreviated "MD" refers to a direction along the length of the film.

The phrase "outside layer" refers to the film layer which comes in immediate contact with the outside environment (atmosphere).

The phrase "middle layer" refers to the layer which is exactly in the middle between outer and sealing layer, such as outer layer/next layer/middle layer/next layer/sealing layer.

The phrase "inner layer" refers to the film layer that comes in direct contact with the product packed. This is also called "sealing layer" as this layer must be hermetically sealed in order to protect the product from ingress of air.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalysed polymers and polyethylene plastomers and elastomers.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is preferably less than 40%.

As used herein the phrase "ethylene vinyl acetate copolymer" refer to copolymers of ethylene and vinyl acetate.

As used herein, the term EVOH refers to saponified products of ethylene vinyl ester copolymers. The ethylene content is typically in the range of 25 to 50%.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term polyamide refers to homopolymers and copolymers. Typical examples are polyamide 6, polyamide 66, polyamide 6/66, polyamide 6/12 and MXD nylon.

As used herein the term "polypropylene" refers to any homopolymer, copolymer, terpolymer, tetrapolymer etc. that includes mer units of propylene. The term as used in the present application includes homopolymers, random copolymers, propylene alpha olefin copolymers, propylene ethylene copolymers propylene-ethylene-alpha olefin copolymers and other propylene polymers.

As used herein, the term "polybutylene" refers to homopolymer of butene-1 or to copolymers with ethylene or propylene.

DETAILED DESCRIPTION

The PVDC used in this invention is preferably a copolymer of vinylidene chloride and vinyl chloride or a copolymer of vinylide chloride and methyl acrylate or a blend of both.

The percentage of EVA used preferably is less than 20% per weight of the total blend.

The percentage of PVC used preferably is less than 2% per weight of the total polymer blend.

The percentage of the epoxidized oil compound preferably is less than 5% per weight of the total polymer blend.

The plasticizer-stabilizer used is preferably one of epoxidized soybean oil, epoxidized linseed oil.

The blend of EVA copolymer, PVC and additives can be a ready made compound in pallet or powder form. A preferred compound is BAYMOD L2450 purchased by the company Lanxess.

The epoxidized soybean oil or epoxidized linseed oil may be preblended to the PVDC copolymer or blended at the same time with the rest of components. Well known mixing techniques may be used to secure that the final blend is homogeneous.

Powder is preferable when the PVDC used is also powder.

In a second aspect, a plastic film is disclosed comprising a layer comprising the composition as mentioned above.

Preferably, the film is comprising five layers, where the middle layer comprises the composition as defined above and the film is heat shrinkable.

In the outside layer the following materials may be used:
1. A polypropylene homopolymer or copolymer having a vicat softening point of less than 105° C. measured under ASTM D 1525. Preferably the polymer is homogeneous, having low molecular weight distribution and comonomer distribution.
2. PP polymer such as random copolymer or homopolymer (among others)
3. Polyethylene polymer such as an alpha olefin copolymer with density 0.860 to about 0.960 or such as an ethylene ester copolymer
4. a cyclic olefin copolymer
5. a styrene polymer
6. an ionomer or a methacrylic acid copolymer
7. a polyamide (care is needed in the barrier property evaluation).

A preferred version comprises a:
1. styrene butadiene copolymer
2. a blend of styrene butadiene copolymer and an ethylene alpha olefin copolymer Between the inner heat sealing layer and the oxygen barrier layer may exist further layers that could comprise any of the polymers mentioned in the possibilities for inner heat sealing layer. Preferred materials are ethylene vinyl acetate, ethylene alpha olefin copolymers, EMA polymers, polypropylene copolymers, polybutylene, styrene homopolymers or copolymers.

Between the outer layer and the PVDC layer, one or more layers may be present.

Preferred materials are ethylene vinyl acetate, ethylene alpha olefin copolymers, EMA polymers, polypropylene copolymers, polybutylene, styrene homopolymers or copolymers.

Typical materials used in the sealing layer are ethylene alpha olefin copolymers and polypropylene copolymers.

Any of the layers described above may also include additives well known in the art such as slip agents, antiblock, polymer processing aids, antistatic, antifog, acid scavengers, odor scavengers and the like. A person skilled in the art may select the right additives according to any particular needs.

In a preferred version of the application, the film is irradiated with e beam radiation of levels from 1 to 10 MRAD.

The material of this invention is preferably biaxially oriented and heat shrinkable.

In a further aspect, the invention comprises a bag or pouch made by the film of the invention and a cheese packed in such a film.

EXAMPLES

Example 1

A 5 layer film is produced in a double bubble commercial line with the following structure:
Inner (sealing) layer, 100% PL1, thickness 25 microns
Adjacent layer 93% E1+7% ADDITIVES, thickness 5 microns
Barrier layer PVDC 1, thickness 4.5 microns
Adjacent layer 30% M1+65% E3+5% ADDITIVES, thickness 11 microns
Outer layer 100% SB1, thickness 7.5 microns
See table 1, 2

Example 2

Inner (sealing) layer, 100% PL1
Adjacent layer 93% E1+7% ADDITIVES
Barrier layer PVDC 2
Adjacent layer 30% M1+65% E2+5% ADDITIVES
Outer layer 100% SB1
Thicknesses the same as example 1.

Comparative Example 3

A 5 layer film is produced in a double bubble (the double bubble method is described in U.S. Pat. No. 3,456,044) commercial line with the following recipe
Inner (sealing layer), 100% PL1
Adjacent layer 93% E1+7% ADDITIVES
Barrier layer PVDC commercial grade
Adjacent layer 30% M1+65% E2+5% ADDITIVES
Outer layer 95% S1+5% ADDITIVES The difference between the examples 1 and 2 which represent the invention and ex. 3 is that the PVDC formulation used in ex. 3 is believed to have a much bigger percentage of migratory materials like epoxidized oils (more than 5% in the blend). These materials are used in order to adjust the permeability to $CO_2$ and $O_2$.

The present invention proposes another way to adjust the permeability, without sacrificing the processability of the blend. As seen in table 3, the formulations of the invention are much more stable even after 3 months.

With the inventive formulations, problems like delaminations of PVDC are also much improved.

All the samples were e-beam radiated with a dose of 4 MRAD prior to bag making.

TABLE 1

| Type | Description | Manufacturer | Melt Index g/10 min | Density g/cm³ | Melting point ° C. |
|---|---|---|---|---|---|
| E1 | EVA | Dupont 3135 X | 0.35 | 0.93 | 95 |
| E2 | EVA | Dupont 3165 | 0.7 | 0.94 | 89 |
| S1 | SB COPOLYMER | DK13 | 10 | 1.01 | |
| M1 | EMA copolymer | ARKEMA LOTRYL 29MAO3 | 2-3.5 | 0.95 | 61 |
| P1 | Ethylene octene copolymer | DOW AFFINITY PL 1880 | 1 | 0.902 | 100 |

Manufacture of the Three PVDC

PVDC 1. Blend of PVDC copolymer (which already incorporates about 2% per weight epoxidized soybean oil) with 11% BAYMOD L2450.

PVDC 2. Blend of PVDC copolymer (which already incorporates about 2% per weight epoxidized soybean oil) with 16% BAYMOD L2450. This blend is used for packaging of special "high gassing" types of cheeses.

PVDC 3. Commercial PVDC with more than 5% epoxidized soybean oil.

Measurements were done three days after the irradiation step.

TABLE 3

| | $O_2$ transmission | $CO_2$ transmission | $CO_2$ transmission After 3 months |
|---|---|---|---|
| Example 1 | 155 | 810 | 750 |
| Example 2 | 410 | 2100 | 1950 |
| Example 3 | 140 | 780 | 450 |

$O_2$ transmission is measured in 23C, 75% RH according to ASTM D3985. Units are $cc/m^2*atm*day$.

$CO_2$ transmission is measured according to internal method using a MOCON type instrument. Units are $cc/m^2*atm*day$. Conditions 23° C. at 0% RH.

We see that the combinations 1 and 2 are much more stable overtime. This is beneficial as it reduces the risks of pack "ballooning" after a certain period of time.

What is claimed is:

1. A film comprising five layers, where a middle layer comprises a polymer blend comprising:
   a) a polyvinylidene chloride (PVDC) polymer, wherein the PVDC polymer is a copolymer wherein a major amount of the copolymer comprises vinylidene chloride and a minor amount of the copolymer comprises one or more monomers selected from the group consisting of vinyl chloride, alkyl acrylate and alkyl methacrylate;
   b) unmodified ethylene vinyl acetate (EVA) with more than 40% vinyl acetate (per weight);
   c) polyvinyl chloride (PVC); and
   d) an epoxidized oil compound and optionally other additives.

2. A film according to claim 1, where the film is heat shrinkable.

3. The film according to claim 1, wherein an outer layer of the film comprises one of:
   a polypropylene polymer
   an ethylene alpha olefin copolymer
   a styrene butadiene polymer
   a polyamide
   a polybutene and/or
   an ethylene vinyl alcohol (EVOH) polymer.

4. The film of according to claim 1, wherein a sealing layer of the film comprises ethylene alpha olefin copolymer.

5. The film according to claim 1, wherein the film is irradiated.

6. The film according to claim 1, having a flat or tubular form.

7. A bag or pouch made from the film of claim 1.

8. A cheese packed in a film according to claim 1.

9. A film comprising at least an outer layer, a sealing layer, and a layer comprising a polyvinylidene chloride (PVDC) blend, wherein the outer layer is a layer which comes into immediate contact with the outside environment and the sealing layer is a layer that comes into direct contact with a product when the film is used to pack a product, and wherein the layer comprising the PVDC blend comprises:
  a) a PVDC polymer, wherein the PVDC polymer is a copolymer wherein a major amount of the copolymer comprises vinylidene chloride and a minor amount of the copolymer comprises one or more monomers selected from the group consisting of vinyl chloride, alkyl acrylate and alkyl methacrylate;
  b) unmodified ethylene vinyl acetate (EVA) with more than 40% vinyl acetate (per weight);
  c) polyvinyl chloride (PVC); and
  d) an epoxidized oil compound and optionally other additives.

10. The film according to claim 9, wherein the film is heat shrinkable.

11. The film according to claim 9, wherein the outer layer of the film comprises one of:
  a polypropylene polymer
  an ethylene alpha olefin copolymer
  a styrene butadiene polymer
  a polyamide
  a polybutene and/or
  an ethylene vinyl alcohol (EVOH) polymer.

12. The film according to claim 9, wherein the sealing layer of the film comprises ethylene alpha olefin copolymer.

13. The film according to claim 9, wherein the film is irradiated.

14. The film according to claim 9, having a flat or tubular form.

15. The film according to claim 9, wherein the percentage of EVA in the PVDC blend is less than 20% per weight of the total PVDC blend.

16. The film according to claim 9, wherein the percentage of PVC in the PVDC blend is less than 2% per weight of the total PVDC blend.

17. The film according to claim 9, wherein the percentage of epoxidized oil compound in the PVDC blend is less than 5% per weight of the total PVDC blend.

18. A bag or pouch made from the film of claim 9.

19. A cheese packed in a film according to claim 9.

20. A film comprising at least an outer layer, a sealing layer, and a barrier layer, wherein the outer layer is a layer which comes into immediate contact with the outside environment and the sealing layer is a layer that comes into direct contact with a product when the film is used to pack a product, and wherein the barrier layer comprises a polymer blend comprising:
  a) a polyvinylidene chloride (PVDC) polymer, wherein the PVDC polymer is a copolymer wherein a major amount of the copolymer comprises vinylidene chloride and a minor amount of the copolymer comprises one or more monomers selected from the group consisting of vinyl chloride, alkyl acrylate and alkyl methacrylate;
  b) unmodified ethylene vinyl acetate (EVA) with more than 40% vinyl acetate (per weight);
  c) polyvinyl chloride (PVC); and
  d) an epoxidized oil compound and optionally other additives.

* * * * *